C. W. LANHAM.
TRACTION WHEEL CONNECTION FOR POWER DRIVEN VEHICLES.
APPLICATION FILED APR. 23, 1918.
1,302,183.
Patented Apr. 29, 1919.
2 SHEETS—SHEET 1.
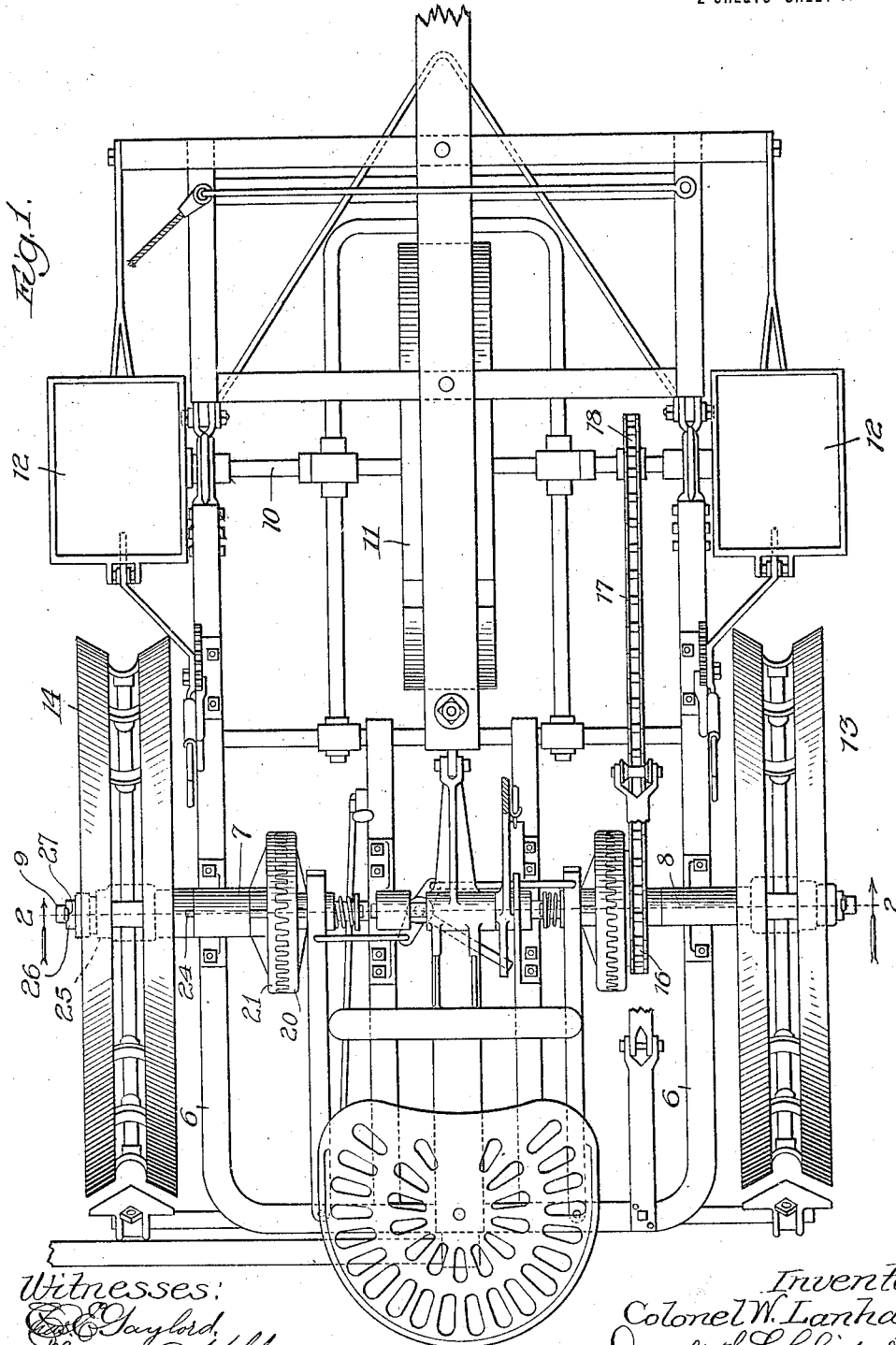

C. W. LANHAM.
TRACTION WHEEL CONNECTION FOR POWER DRIVEN VEHICLES.
APPLICATION FILED APR. 23, 1918.
1,302,183.
Patented Apr. 29, 1919.
2 SHEETS—SHEET 2.
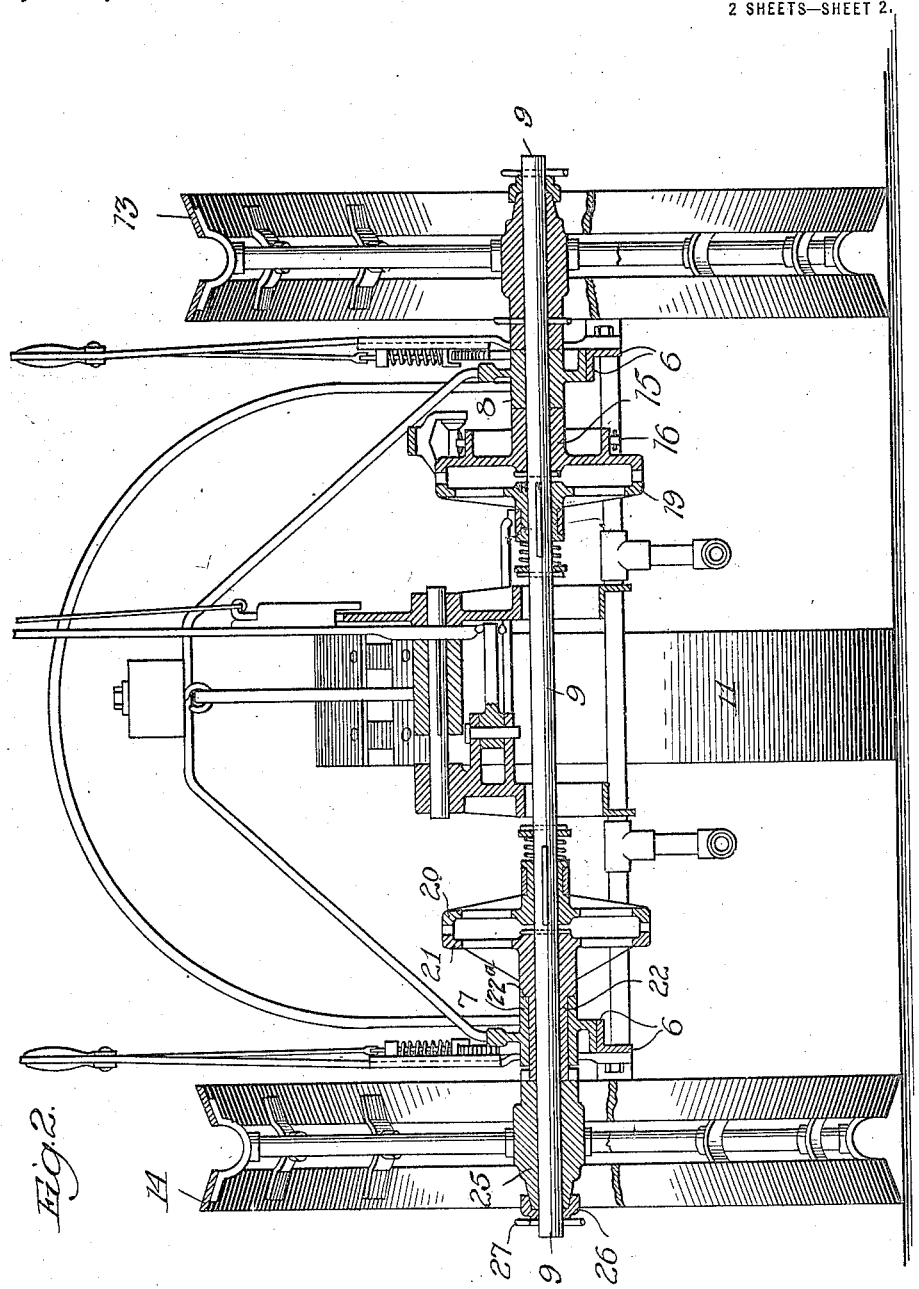

UNITED STATES PATENT OFFICE.

COLONEL W. LANHAM, OF CHICAGO, ILLINOIS.

TRACTION-WHEEL CONNECTION FOR POWER-DRIVEN VEHICLES.

1,302,183.

Specification of Letters Patent.   Patented Apr. 29, 1919.

Application filed April 23, 1918.   Serial No. 230,256.

*To all whom it may concern:*

Be it known that I, COLONEL W. LANHAM, a citizen of the United States, residing at Chicago, in the county of Cook and State of Illinois, have invented a new and useful Improvement in Traction-Wheel Connections for Power-Driven Vehicles, of which the following is a specification.

My invention relates to power driven vehicles employing traction wheels, one of which is rotatably mounted on a shaft and in connection with which, means are provided for alternately clutching and unclutching the wheel to or from the shaft, my invention having been devised for use, more particularly, in corn-planters of the so-called wireless check-rower type.

My primary object is to provide for the mounting of the one of the supporting wheels of the vehicle, which is rotatably mounted on the supporting shaft, in such a manner that it may be clutched to and unclutched from the shaft under the control of the operator, and in the transporting of the vehicle, the wheel may be readily detached therefrom without disturbing the bearings and readily applied thereto in assembling the parts of the machine.

Referring to the accompanying drawings, Figure 1 is a plan view of a corn-planter in connection with which I have chosen to illustrate my invention. Fig. 2 is an enlarged section taken at the line 2—2 on Fig. 1 and viewed in the direction of the arrows. Fig. 3 is a perspective view of the inner end of the hub-portion of the wheel and the outer end of a clutch sleeve coöperating therewith; and Fig. 4, a view in elevation showing these parts in assembled relation.

It may be stated as a premise to the description of my particular improvement that the corn-planter, as, shown, comprises a main frame 6 carrying bearings 7 and 8, through the medium of which the main shaft 9 is supported relatively to the frame. A second shaft, represented at 10, extends crosswise of the frame 6 and parallel with the shaft 9 and carries a marking wheel 11 which, through the shaft 9, operates corn feeding devices (not shown), at the ends of this shaft coöperating with the seed-hoppers 12 mounted on the frame of the machine, the shaft 10 and parts carried thereby being so mounted that they may be bodily raised to lift the wheel 11 out of engagement with the ground when desired.

The shaft 9 is provided at one end with a supporting wheel 13 rigidly connected therewith and at its opposite end with a supporting wheel 14 journaled thereon. This shaft carries a clutch member 15 rotatable thereon which carries a sprocket wheel 16, which connects by means of a sprocket chain 17 with a sprocket 18 on the shaft 10. A clutch member coöperating with the clutch member 15 is represented at 19, this clutch member being splined on the shaft 9 to be movable into and out of clutch engagement with the clutch 15. The shaft 9 toward its opposite end, carries two coöperating clutch sections 20 and 21, the clutch section 21 being provided with a sleeve member 22 of reduced diameter, which encircles the shaft 9 and is interposed between the latter and the bearing 7, the outer end of this sleeve presenting two diametrically opposed lugs 23, which extend into recesses 24 in the hub 25 of the wheel 14, this hub extending wholly beyond the outer end of the bearing 7, the parts just described being secured together in the interlocking relation stated for connecting together the wheel 25 and clutch member 21 for driving the former from the latter, by means of a cap 26 which fits over the outer end of the shaft 9 and is held against accidental displacement by a pin 27 extending through the cap and shaft. The reduced portion 22 forms a shoulder 22ª which opposes the inner end of the bearing 7 and forms means limiting the movement of the sleeve 22 in an outward direction.

The member 20 is slidable along the shaft into and out of intermeshing relation with the clutch section 21 and this slidable clutch member and also the clutch member 19 are adapted by means shown, but which need not be described so far as the present invention is concerned, to simultaneously clutch the sprocket wheel 16 and the wheel 14 to the shaft 9 to cause them to operate as a unitary structure and in the particular arrangement shown, to rotate in unison with the marking wheel 11. It may be further stated that in the arrangement shown, the operator may, at will, unclutch the wheel 14 from the shaft 9 by operating the clutch section 20, thus permitting the vehicle to be readily moved in a circular path, as for example in turning it around, the wheels thus having a differential action.

It will be noted from the foregoing description and the drawings that the wheel 14 may be readily removed from and replaced on the shaft 9 into and out of interlocking relation with the sleeve 22 directly connected with the clutch 21, without disturbing the bearings for the shaft 9, which is of considerable, practical, importance, especially as these machines are oftentimes shipped and stored with the supporting wheels removed from the machine.

While I have illustrated and described a particular construction embodying my invention, I do not wish to be understood as intending to limit it thereto, as the same may be variously modified and altered without departing from the spirit of my invention.

What I claim as new and desire to secure by Letters Patent is:

1. In a machine of the character set forth, the combination of a frame, a rotatable shaft, a supporting wheel journaled on said shaft at the outer side of said frame, a sleeve-member on said shaft, a bearing on said frame and in which said sleeve is journaled, means releasably engaging said sleeve for connecting said sleeve and shaft together to cause them to be relatively non-rotatable, and means for operatively connecting said sleeve and wheel together to cause them to be non-rotatable relatively to each other.

2. In a machine of the character set forth, the combination of a frame, a rotatable shaft, a supporting wheel journaled on said shaft at the outer side of said frame, a sleeve-member on said shaft, a bearing on said frame and in which said sleeve is journaled, means releasably engaging said sleeve for connecting said sleeve and shaft together to cause them to be relatively non-rotatable, and an intermeshing tooth connection between said sleeve and wheel for operatively connecting said sleeve and wheel together to cause them to be non-rotatable relatively to each other.

3. In a machine of the character set forth, the combination of a frame, a rotatable shaft, a supporting wheel journaled on said shaft at the outer side of said frame, a sleeve-member on said shaft, a bearing on said frame and in which said sleeve is journaled, means releasably engaging said sleeve for connecting said sleeve and shaft together to cause them to be relatively non-rotatable, means interlocking said wheel with said sleeve to cause them to be non-rotatable relative to each other, and means on the outer end of said shaft for holding said sleeve and wheel against separation in a longitudinal direction.

4. In a machine of the character set forth, the combination of a frame, a rotatable shaft, a supporting wheel journaled on said shaft at the outer side of said frame, a shaft at the outer side of said frame, a sleeve-member on said shaft, a bearing on said frame and in which said sleeve is journaled, means releasably engaging said sleeve for connecting said sleeve and shaft together to cause them to be relatively non-rotatable, intermeshing tooth connection between said sleeve and wheel for causing them to be non-rotatable relative to each other, and means on the outer end of said shaft for holding said sleeve and wheel against separation in a longitudinal direction.

5. In a machine of the character set forth, the combination of a frame, a rotatable shaft, a supporting wheel journaled on said shaft at the outer side of said frame, a sleeve member on said shaft, a bearing on said frame and in which said sleeve is journaled, means releasably engaging said sleeve for connecting said sleeve and shaft together to cause them to be relatively non-rotatable, means interlocking said wheel with said sleeve to cause them to be non-rotatable relative to each other, a cap on the outer end of said shaft and containing a transversely-disposed recess, and a pin extending through said recess and shaft.

6. In a machine of the character set forth, the combination of a frame, a rotatable shaft, a supporting wheel journaled on said shaft at the outer side of said frame, a sleeve-member on said shaft, a bearing on said frame and in which said sleeve is journaled, means limiting the movement of said sleeve in an outward direction in said bearing, means releasably engaging said sleeve for connecting said sleeve and shaft together to cause them to be relatively non-rotatable, and means for operatively connecting said sleeve and wheel together to cause them to be non-rotatable relatively to each other.

7. In a machine of the character set forth, the combination of a frame, a rotatable shaft, a supporting wheel journaled on said shaft at the outer side of said frame, a sleeve-member on said shaft, a bearing on said frame and in which said sleeve is journaled, means limiting the movement of said sleeve in an outward direction in said bearing, a clutch-member slidable along said shaft and coöperating with said sleeve for connecting said clutch and sleeve together and between which and said frame said sleeve is located, and means for operatively connecting said sleeve and wheel together to cause them to be non-rotatable relatively to each other.

8. In a machine of the character set forth, the combination of a frame, a rotatable shaft, a supporting wheel journaled on said shaft at the outer side of said frame, a sleeve-member on said shaft, a bearing on said frame and in which said sleeve is journaled, means limiting the movement of said sleeve in an outward direction in said bearing, a clutch-member slidable along said shaft and coöperating with said sleeve for connecting said clutch and sleeve together and between which and said frame said sleeve is located, a spring pressing said clutch-member into engagement with said sleeve, and means for operatively connecting said sleeve and wheel together to cause them to be non-rotatable relatively to each other.

9. In a machine of the character set forth, the combination of a frame, a rotatable shaft, a supporting wheel journaled on said shaft at the outer side of said frame, a sleeve-member on said shaft, a bearing on said frame and in which said sleeve is journaled, means limiting the movement of said sleeve in an outward direction in said bearing, a clutch-member keyed to and slidable along said shaft and coöperating with said sleeve for connecting said clutch and sleeve together and between which and said frame said sleeve is located, a spring pressing said clutch-member into engagement with said sleeve, and means for operatively connecting said sleeve and wheel together to cause them to be non-rotatable relatively to each other.

COLONEL W. LANHAM.

Copies of this patent may be obtained for five cents each, by addressing the "Commissioner of Patents, Washington, D. C."